G. T. PILLINGS.
Milling-Machines.

No. 141,012.   Patented July 22, 1873.

Witnesses.
Thos. A. Burtt,
J. Snowden Bell.

Inventor:
George T. Pillings,
by his Atty,
Horace Binney, 3rd.

UNITED STATES PATENT OFFICE.

GEORGE T. PILLINGS, OF PHILADELPHIA, PENNSYLVANIA.

IMPROVEMENT IN MILLING-MACHINES.

Specification forming part of Letters Patent No. 141,012, dated July 22, 1873; application filed April 19, 1873.

*To all whom it may concern:*

Be it known that I, GEORGE T. PILLINGS, of the city and county of Philadelphia, in the State of Pennsylvania, have invented a new and useful Improved Milling-Lathe; and I do hereby declare the following to be a full, clear, and exact description thereof, which will enable others skilled in the art to which it appertains to make and use the same, reference being had to the accompanying drawing, which forms a part of this specification, and in which—

Figure 1:
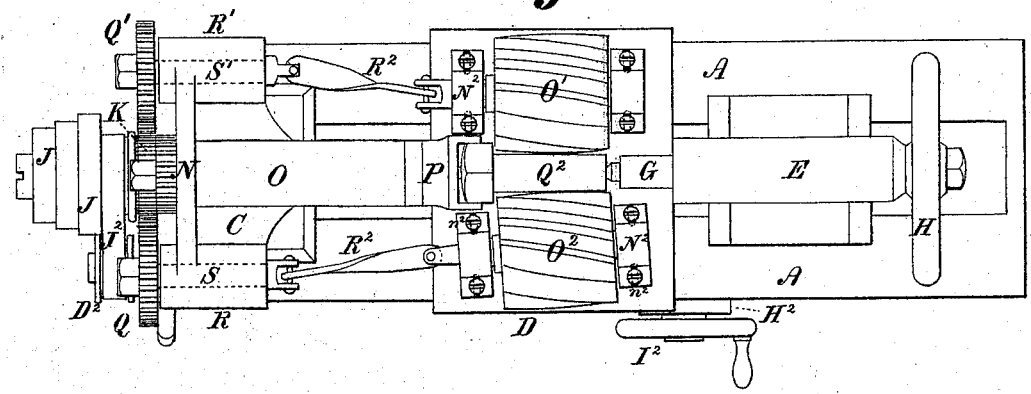
Figure 2:
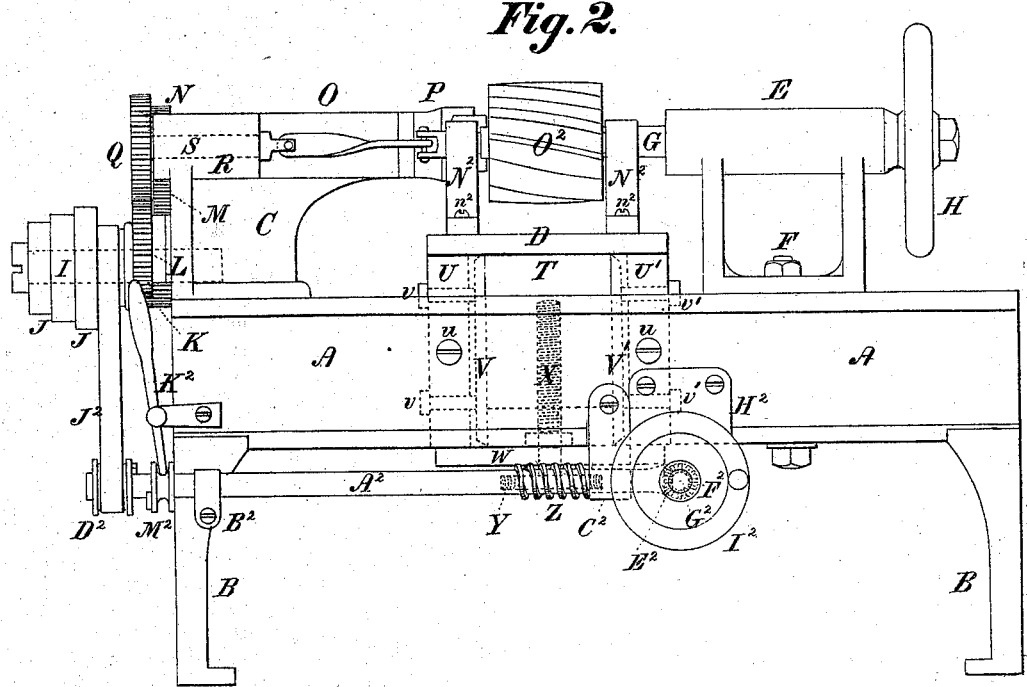

Figure 1 is a plan, and Fig. 2 a side elevation, of the said invention.

The same parts are denoted by the same letters in both figures.

The object of this invention is to turn bolts or other round work more rapidly than can be done by the ordinary lathe-cutter, which requires time to travel along the surface of the work; and to this end it consists in the combination with the lathe-centers of two revolving cutters of sufficient length to turn the whole of said surface without longitudinal motion, arranged on opposite sides of said centers, and supported on a vertically-moving carriage, which permits the work to be placed on the centers while the cutters are depressed, and the cutters to be subsequently elevated to the level of the work for operation thereon. It also consists in various combinations of gearing for operating said cutters and carriage, and in devices by which the carriage is guided in its vertical movement.

A in the drawing represents the lathe-bed, supported on legs B B. C is the head-stock; D, the vertically-moving carriage, which supports the cutters, and E the tail-stock, which is of the usual construction, longitudinally adjustable by means of a bolt and set-nut, F, and carrying the ordinary poppet-head spindle G and dead-center; which are adjusted by a screw operated by hand-wheel H, as usual. I is a stud, on which are mounted the pulleys J, cast in one piece with gear-wheel K, and driven by power applied to one of said pulleys. The gear K meshes into a gear, L, on each side, (one of which is not shown,) and into a gear, M, above it. M meshes into gear N, which is keyed to the lathe-spindle. This spindle passes through a sleeve, O, in the head-stock, and carries the usual center and chuck P. The gears L mesh into gears Q $Q^1$, which are keyed to the cutter-driving shafts S S. These shafts pass through sleeves R $R^1$ in the head-stock, and are connected to the journals of the cutters by knuckle-joints $R^2$. To the carriage D are fastened, by set-screws $n^2$ passing through slots in their feet, the bearings $N^2$ of cutters $O^1$ $O^2$. These cutters, as shown in the drawing, are long enough to turn work of ordinary length without requiring either work or cutters to be moved longitudinally. $O^1$ is the roughing-cutter, and is usually set a little higher than the finishing-cutter $O^2$. I prefer to make them both of steel. They are laterally adjustable, by means of the screws $n^2$, toward or from the centers, and may be set either parallel to the axis of the centers or inclined thereto, the slots being wide enough to permit such inclination. Bolts passing through the carriage may be substituted for the set-screws.

In Fig. 1 I have shown one of the cutters parallel and the other inclined to the axis of the centers; but in operation they must, of course, be set either both parallel, for turning straight work, or both oblique, for turning work to a taper.

T is a rectangular block, formed on or rigidly attached to the bottom of carriage D, and moves vertically in the central opening between the sides of the lathe-bed, as hereinafter described. U U' are stays or blocks placed across the opening in the bed, and secured to said bed by screws $u$ on either side. Between these stays and the slide are the gibs V V', which, together with the sides of the bed A, form the guides of slide T. The gibs are set up by set-screws $v$ $v'$ working through the stays. X is a screw-shaft, shown in dotted lines in Fig. 2, and provided with a collar bearing on plate W; or the shaft may be made with a shoulder for the same purpose. The bearing-plate W is screwed to the bottom of the stays. The male screw on shaft X works in a female screw on slide T, so that the rotation of the shaft raises or lowers the carriage. A gear, Y, is keyed to said shaft below the plate W, against which its hub bears, so as to prevent upward movement of the shaft. The gear Y meshes with a worm, Z, on shaft $A^2$, which revolves in bearings $B^2$ $C^2$, and carries on one end the loose pulley $D^2$ and on the other end the bevel-pinion $E^2$, meshing with bevel-gear $F^2$ on shaft $G^2$, which is supported by strap $H^2$, and has on its outer end the hand-wheel $I^2$. The pulley $D^2$ is driven by a band, $J^2$, passing over the hub of gear K, and the shaft $A^2$ and mechanism operated thereby are thrown into or out of gear by the shifting-lever $K^2$ and clutch $M^2$.

In the operation of this machine, the carriage and cutters having been lowered so as to permit the work $Q^2$ to be placed on the centers in the usual manner, the elevating mechanism is thrown into gear by lever $K^2$, and the screw-shaft X, being revolved by gear V and worm-shaft $A^2$, raises the slide and carriage till the cutters are in working position, as shown in Fig. 2, after which the lever is unshipped.

The height of the cutters may be accurately adjusted by means of wheel $I^2$, and when the work is completed the carriage may, by the same wheel, be lowered to its former position without stopping the machine, the knuckle-joints permitting the cutters to be elevated and depressed while revolving.

What I claim as my invention, and desire to secure by Letters Patent of the United States, is—

1. The combination, with the lathe-centers, of the two revolving cutters, arranged on opposite sides of said centers, and the vertically-moving carriage, on which said cutters are supported.

2. The combination of shafts S S′, knuckle-joints $R^2$, and vertically-movable revolving cutters $O^1$ $O^2$.

3. The combination, with a vertically-movable slide and carriage, on which revolving cutters are mounted, of screw-shaft X, gear Y, worm Z, and shaft $A^2$, revolved by power applied to pulley $D^2$.

4. The combination, with a vertically-movable slide and carriage, on which revolving cutters are mounted, of screw-shaft X, gear Y, worm Z, and shaft $A^2$, revolved by wheel $I^2$ and gears $E^2$ and $F^2$.

5. The combination of the lathe-bed, stays U U′, gibs V V′, and slide T, supporting the carriage and cutters.

GEORGE T. PILLINGS.

Witnesses:
EDWIN J. HOWLETT,
WM. R. WRIGHT.